(12) United States Patent
Yau et al.

(10) Patent No.: US 10,592,438 B2
(45) Date of Patent: Mar. 17, 2020

(54) FIRMWARE CONFIGURATION THROUGH EMULATED COMMANDS

(71) Applicant: American Megatrends International, LLC, Norcross, GA (US)

(72) Inventors: Kai Yau, Duluth, GA (US); Muthu Kumar Sathiyanesan, Norcross, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 115 days.

(21) Appl. No.: 14/931,184

(22) Filed: Nov. 3, 2015

(65) Prior Publication Data

US 2017/0124004 A1    May 4, 2017

(51) Int. Cl.
| | | |
|---|---|---|
| *G06F 13/10* | (2006.01) | |
| *G06F 13/42* | (2006.01) | |
| *G06F 13/38* | (2006.01) | |
| *G06F 9/4401* | (2018.01) | |

(52) U.S. Cl.
CPC .......... *G06F 13/102* (2013.01); *G06F 9/4411* (2013.01); *G06F 13/385* (2013.01); *G06F 13/4282* (2013.01)

(58) Field of Classification Search
CPC .... G06F 13/102; G06F 9/4411; G06F 13/385; G06F 13/4282
See application file for complete search history.

(56) References Cited

U.S. PATENT DOCUMENTS

| | | | | |
|---|---|---|---|---|
| 6,240,519 B1* | 5/2001 | James, Jr. | ............... | G06F 21/31 |
| | | | | 714/6.1 |
| 6,687,854 B1* | 2/2004 | Liu | ........................ | G06F 11/327 |
| | | | | 713/2 |
| 7,349,956 B2* | 3/2008 | Anderson | ................. | G06F 1/26 |
| | | | | 348/701 |
| 2005/0144432 A1* | 6/2005 | Wu | .......................... | G06F 8/65 |
| | | | | 713/2 |
| 2006/0026462 A1* | 2/2006 | Zhang | ....................... | G06F 8/65 |
| | | | | 714/36 |
| 2006/0123220 A1* | 6/2006 | Colson | ................... | G06F 9/4401 |
| | | | | 713/1 |
| 2007/0005867 A1* | 1/2007 | Diamant | ............... | G06F 13/385 |
| | | | | 710/306 |
| 2009/0319782 A1* | 12/2009 | Lee | ........................ | G06F 21/34 |
| | | | | 713/156 |
| 2010/0042710 A1* | 2/2010 | Lin | ......................... | H04L 41/00 |
| | | | | 709/222 |
| 2013/0232478 A1* | 9/2013 | Jeon | ........................ | G06F 8/654 |
| | | | | 717/170 |
| 2013/0318216 A1* | 11/2013 | Sakamaki | ........... | H04L 41/0813 |
| | | | | 709/221 |

(Continued)

*Primary Examiner* — Tim T Vo
*Assistant Examiner* — Harry Z Wang
(74) *Attorney, Agent, or Firm* — Newport IP, LLC

(57) ABSTRACT

Technologies are disclosed herein that allow configuration of firmware by a firmware configuration device connected to a target computer. The firmware configuration device may emulate keystroke and/or mouse movement data to transmit firmware configuration data to the target computer. The target computer can also transmit status information and/or commands through keyboard status light signals.

18 Claims, 8 Drawing Sheets

(56) References Cited

U.S. PATENT DOCUMENTS

2014/0245296 A1\* 8/2014 Sethuramalingam ........................ G06F 9/45533 718/1
2015/0229509 A1\* 8/2015 Castine ................ H04L 41/046 709/208

\* cited by examiner

FIRMWARE CONFIGURATION THROUGH EMULATED COMMANDS

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. Configuring the firmware requires the use of complex operations, tools and utilities that are platform and operating system specific.

In some environments, such as in server farms, firmware may need to be updated for computers that lack consoles or that are remotely located. A baseboard management controller ("BMC") attached to the motherboard of a computer can allow the firmware of the computer to be configured using keyboard, video, and mouse redirection. However, BMCs are not practical for small computer systems such as small servers, desktops and laptops, or any other scenario without a BMC or with a BMC with limited functionality. It is with respect to these and other considerations that the disclosure made herein is presented.

SUMMARY

Technologies are described herein for systems and methods for firmware configuration through emulated commands. Through the utilization of the technologies and concepts presented herein, firmware can be configured for headless computing systems where a console is not available, or remotely for any network-connected computer.

According to one aspect presented herein, a method of configuring firmware of a target computer includes initializing the target computer and an associated firmware, the target computer having at least one universal serial bus ("USB") port. The method also includes determining if a firmware configuration device is detected at the target computer, and the firmware configuration device being detectable as an emulated keyboard at the at least one USB port. The method also includes initializing a firmware configuration module to communicate with the firmware configuration device based on the determination, and receiving firmware configuration data from the firmware configuration device, the firmware configuration data including emulated keystroke data.

According to another aspect presented herein, a computer-readable storage medium has computer-executable instructions which, when executed by a computer, causes the computer to initialize a firmware and at least one USB port of the computer. The instructions also cause the computer to determine whether a firmware configuration device is detected as an emulated keyboard at the USB port. Based upon this determination, the computer initializes a firmware configuration module to communicate with the firmware configuration device. Also, the instructions cause the computer to receive firmware configuration data from the firmware configuration device. The firmware configuration data includes emulated keystroke data.

According to yet another aspect presented herein, an apparatus is provided. The apparatus includes a processor and a USB interface in communication with the processor. The apparatus also includes a computer-readable storage medium having computer-executable instructions which, when executed by the processor, cause the apparatus to receive command codes at the USB interface. The command codes are received as combinations of keyboard status light signals. In response to the command codes the apparatus transmits firmware configuration data over the USB interface. The firmware configuration data is represented as emulated keystrokes or emulated mouse movement data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
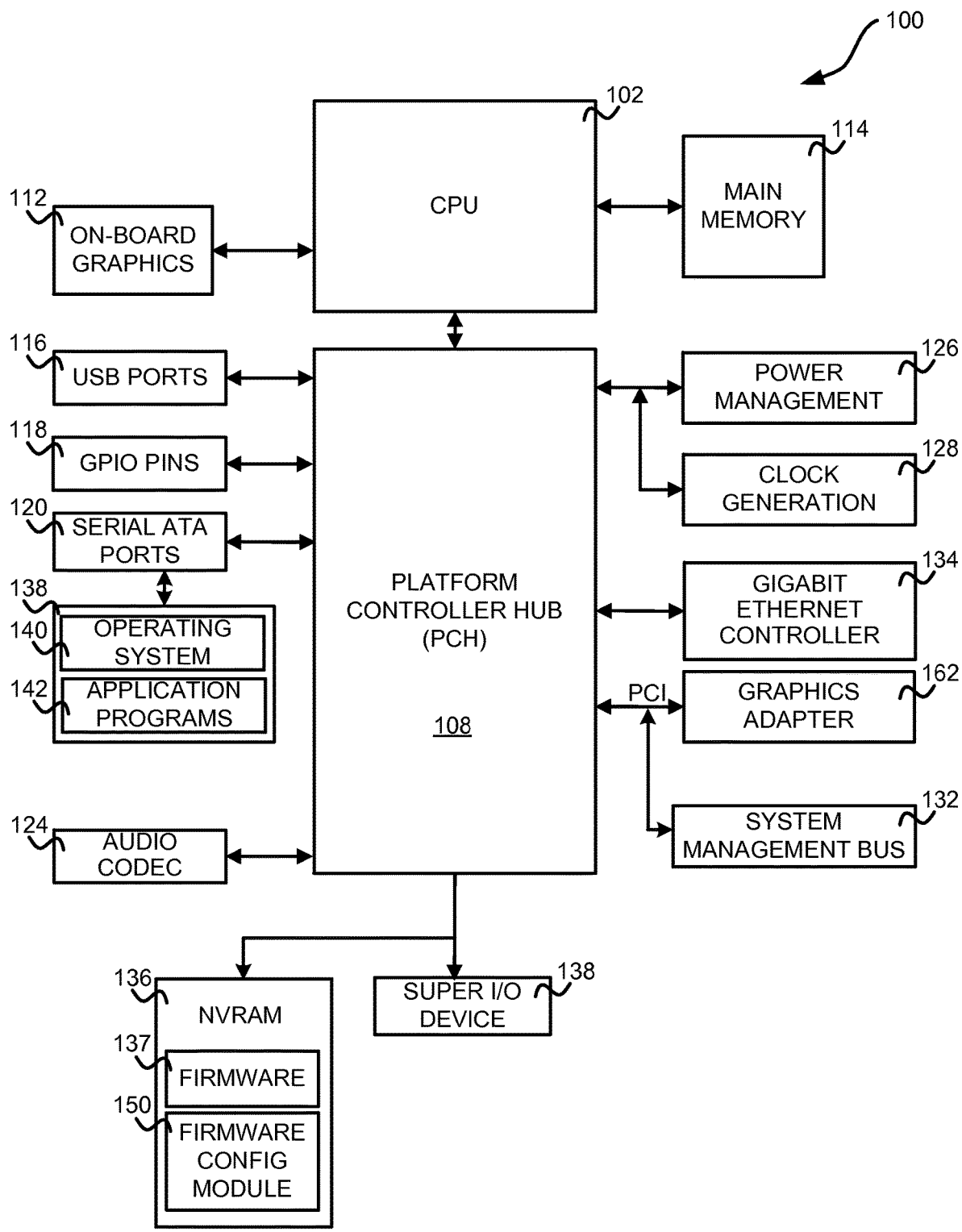
FIG. 1 is a computer architecture diagram that illustrates various components of a computer that provides an illustrative operating environment for the implementations presented herein.

Embodiments of the disclosure presented herein provide methods, systems, apparatuses, and computer-readable media for firmware configuration through emulated commands. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computing system 100 that is operative for remote platform configuration.

In order to provide the functionality described herein, the computing system 100 can include a baseboard, or "motherboard," which can be a printed circuit board to which a multitude of components or devices may be connected by way of a system bus or other electrical communication path. In one illustrative embodiment, a central processing unit ("CPU") 102 operates in conjunction with a Platform Controller Hub ("PCH") 108. The CPU 102 may be a standard central processor that performs arithmetic and logical operations necessary for the operation of the computing system 100. The computing system 100 may include a multitude of CPUs 102. Each CPU 102 might include multiple processing cores.

The CPU 102 provides an interface to a random access memory ("RAM") used as the main memory 114 in the computing system 100 and, possibly, to an on-board graphics adapter 112. The PCH 108 may provide an interface between the CPU 102 and the remainder of the computing system 100.

The PCH 108 may also be responsible for controlling many of the input/output functions of the computing system 100. In particular, the PCH 108 may provide one or more universal serial bus ("USB") ports 116, an audio codec 124, a Gigabit Ethernet Controller 134, and one or more general purpose input/output ("GPIO") pins 118. The USB ports 116 may include USB 2.0 ports, USB 3.0 ports and USB 3.1 ports among other USB ports. Furthermore, as is explained in more detail below with reference to FIG. 4, the USB ports 116 may allow connection and interface with a keyboard, a mouse, and/or a keystroke/mouse emulator, for communication with the computing system 100. The audio codec 124 may include Intel High Definition Audio, Audio Codec '97 ("AC'97") and Dolby TrueHD among others. Power management circuitry 126 and clock generation circuitry 128 may also be utilized through the PCH 108.

The PCH 108 may also include functionality for providing networking functionality through a Gigabit Ethernet Controller 134. The Gigabit Ethernet Controller 134 is capable of connecting the computing system 100 to another computing system via a network. Connections which may be made by the Gigabit Ethernet Controller 134 may include LAN or WAN connections. LAN and WAN networking environments are commonplace in offices, enterprise-wide computer networks, intranets, and the internet.

The PCH 108 may also provide a bus for interfacing peripheral card devices such as a graphics adapter 162. In one embodiment, the bus comprises a PCI bus. The PCI bus may include a Peripheral Component Interconnect ("PCI") bus, a Peripheral Component Interconnect eXtended ("PCI-X") bus or a Peripheral Component Interconnect Express ("PCIe") bus among others. The PCH 108 may also provide a system management bus 132 for use in managing the various components of the computing system 100.

The PCH 108 is also configured to provide one or more interfaces for connecting mass storage devices to the computing system 100. For instance, according to an embodiment, the PCH 108 includes a serial advanced technology attachment ("SATA" or "serial ATA") adapter for providing one or more serial ATA ports 120. The serial ATA ports 120 may be connected to one or more mass storage devices storing an operating system 140 and application programs 142, such as the SATA disk drive 138. As known to those skilled in the art, an operating system 140 comprises a set of programs that control operations of a computer and allocation of resources. An application program 142 is software that runs on top of the operating system 140 software, or other runtime environment, and uses computer resources to perform application specific tasks desired by the user.

According to one embodiment of the invention, the operating system 140 comprises the LINUX operating system. According to another embodiment of the invention the operating system 140 comprises a version of the WINDOWS operating system from MICROSOFT CORPORATION. According to other embodiments, the operating system 140 can comprise the UNIX, SOLARIS, or Mac OS X operating system. It should be appreciated that other operating systems may also be utilized.

The mass storage devices connected to the PCH 108, and their associated computer-readable storage media, provide non-volatile storage for the computing system 100. Although the description of computer-readable storage media contained herein refers to a mass storage device, such as a hard disk or CD-ROM drive, it should be appreciated by those skilled in the art that computer-readable storage media can be any available media that can be accessed by the computing system 100.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computing system 100.

A low pin count ("LPC") interface may also be provided by the PCH 108 for connecting a Super I/O device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") 136 for storing the firmware 137 that includes program code containing the basic routines that help to start up the computing system 100 and to transfer information between elements within the computing system 100. Some examples of firmware 137 include Basic Input/Output System ("BIOS"), firmware that is compatible with the Unified Extensible Firmware Interface ("UEFI"), or Open Firmware among others. The NVRAM 136 may also, according to some implementations, store a firmware configuration module 150 that includes program code containing basic routines and/or drivers for receiving emulated keystrokes and mouse movements. The emulated keystrokes and mouse movements are described more fully below with reference to FIGS. 5-8. Additionally, according to some implementations, the firmware configuration module 150 is a portion of program code within the firmware 137 rather than being logically separate, as illustrated. Other combinations of the firmware 137 and firmware configuration module 150 are also possible.

It should be appreciated that the program modules disclosed herein, including the firmware 137 and firmware configuration module 150, may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computing system 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces (such as the Gigabit Ethernet Controller 134), other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory when the software or firmware 137 is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 100 may comprise other types of computing devices, including hand-held computers, embedded computer systems, personal digital assistants, and other types of computing devices known to those skilled in the art. It is also contemplated that the computing system 100 may not include all of the components shown in FIG. 1, may include other components that are not explicitly shown in FIG. 1, or may utilize an architecture completely different than that shown in FIG. 1.

Figure 2:
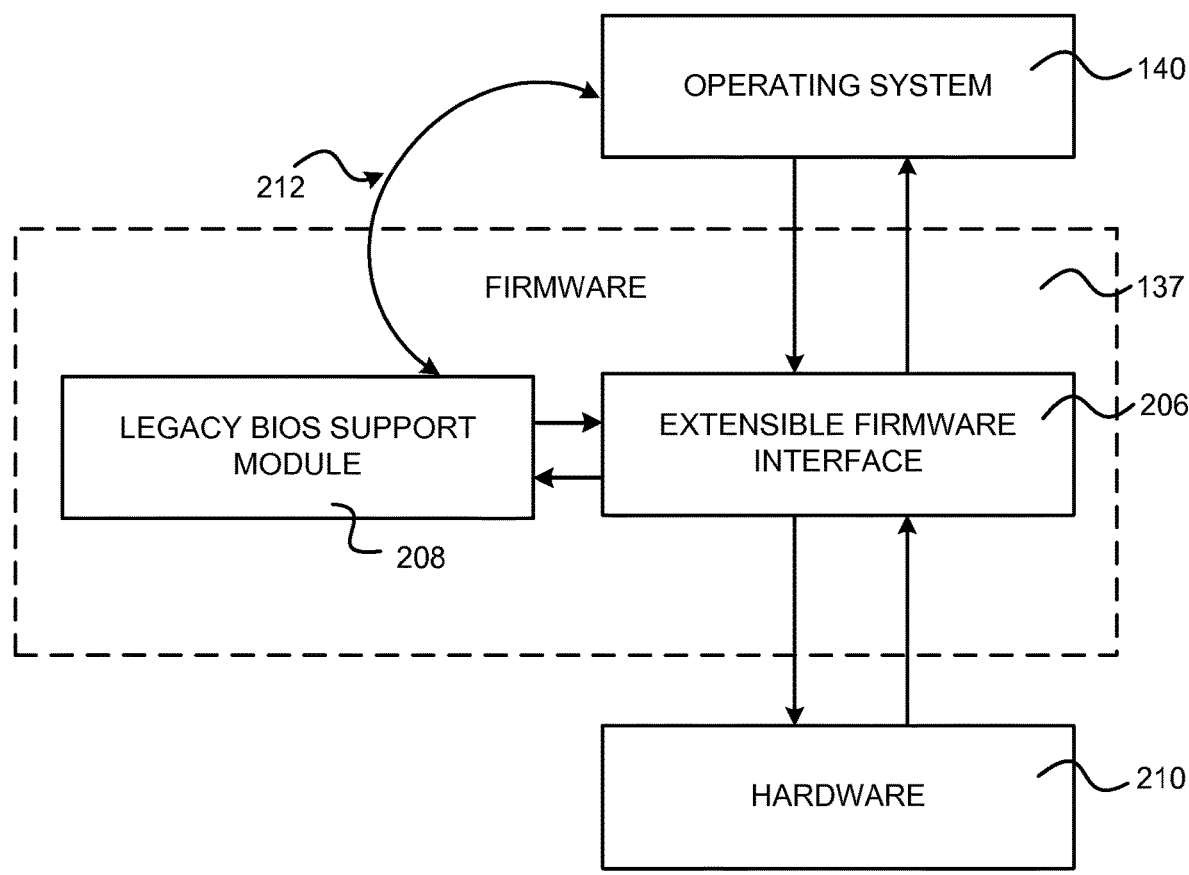
FIG. 2 is a block diagram illustrating aspects of an interface between a firmware and an operating system according to one or more technologies presented herein.

Referring now to FIG. 2, a block diagram illustrates aspects of an interface between a UEFI firmware 137 and an operating system 140 according to one or more embodiments presented herein. As described with respect to FIG. 1, the firmware 137 may comprise a firmware compatible with the UEFI Specification (which may be referred to herein as the "Specification") from the UEFI FORUM. The UEFI Specification describes an interface between the operating system 140 and the system firmware 137. The UEFI Specification also defines an interface that platform firmware may implement, and an interface that the operating system 140 may use while booting. How the firmware 137 implements the interface may be left up to the manufacturer of the firmware. The UEFI Specification can define a way for the operating system 140 and firmware 137 to communicate information necessary to support the operating system boot process.

According to some embodiments, both a UEFI-compatible firmware 206 and a legacy BIOS support module 208 may be present in the UEFI firmware 137. This allows the computing system 100 to support a UEFI firmware interface and a legacy BIOS firmware interface. In order to provide this functionality, an interface 212 may be provided for use by legacy operating systems and applications. According to other embodiments, only one of the UEFI-compatible firmware 206 and the legacy BIOS support module 208 may be present in the firmware 137. According to yet other embodiments, the firmware 137 may interface with the hardware 210 through any of various other architectures, components, or modules for the firmware without specific involvement of the UEFI-compatible firmware 206 or the legacy BIOS support module 208. Additional details regarding the operation and architecture of a UEFI Specification compliant-firmware can be found in the UEFI Specification and in the specifications that make up the EFI Framework, both of which are expressly incorporated herein by reference.

Figure 3:
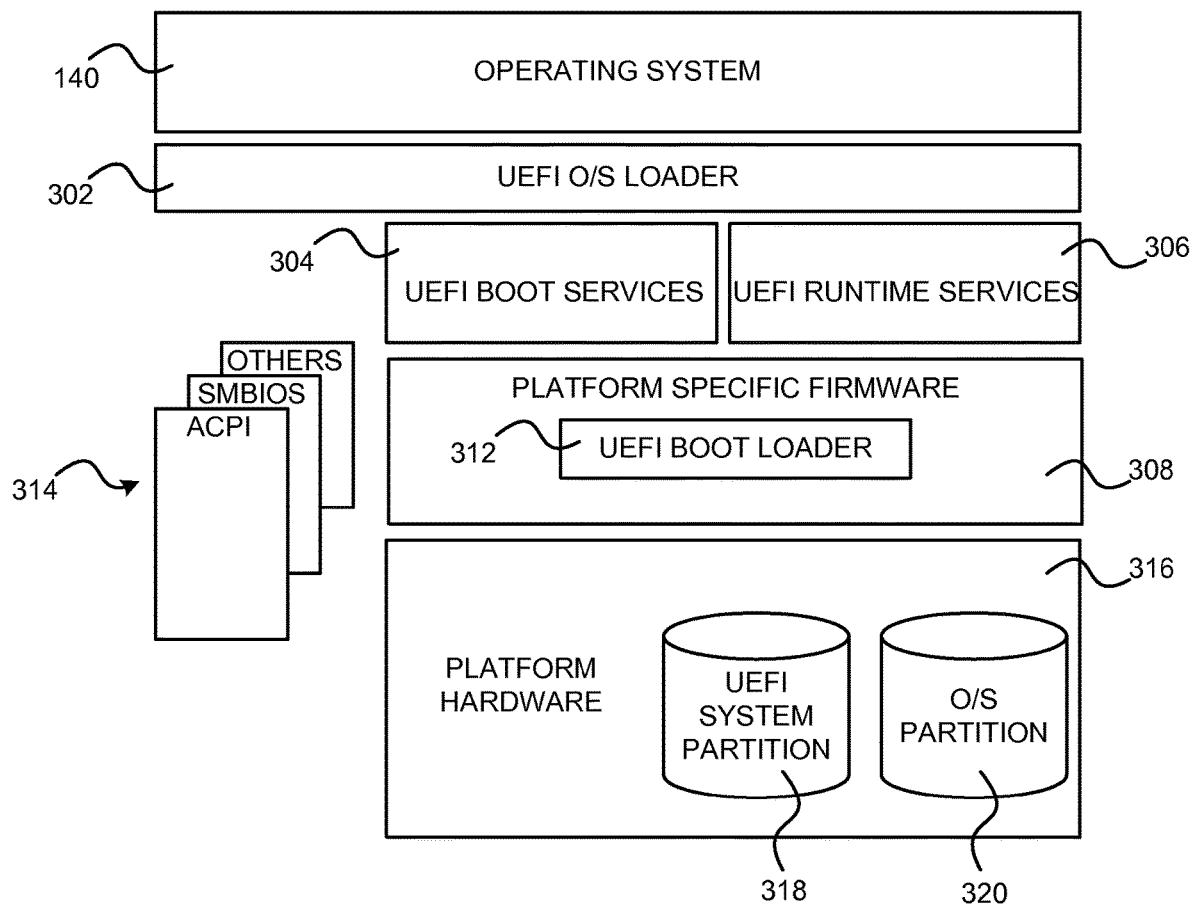
FIG. 3 is a block diagram illustrating an architecture for firmware that provides an operating environment for one or more technologies presented herein.

Turning now to FIG. 3, a block diagram illustrates the architecture for a UEFI specification-compliant firmware that provides an operating environment for one or more embodiments presented herein. As shown in FIG. 3, the architecture can include platform hardware 316 and an operating system 140. The platform firmware 308 may retrieve an operating system ("OS") image from the UEFI system partition 318 using a UEFI boot loader O/S Loader 302 ("OS boot loader 302"). The OS boot loader 302 may retrieve an OS image from the O/S partition 320.

Once started, the OS boot loader 302 may continue to boot the complete operating system 140. In doing so, the OS boot loader 302 may use UEFI boot services 304, runtime services 306, and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI boot loader 312 during the boot phase. For example, a set of runtime services may be presented to ensure appropriate abstraction of base platform hardware resources used by the operating system 140 during its operation. UEFI allows extension of platform firmware by loading UEFI driver and UEFI application images which, when loaded, have access to UEFI-defined runtime and boot services. Various program modules can provide the boot-time and run-time services.

Figure 4:
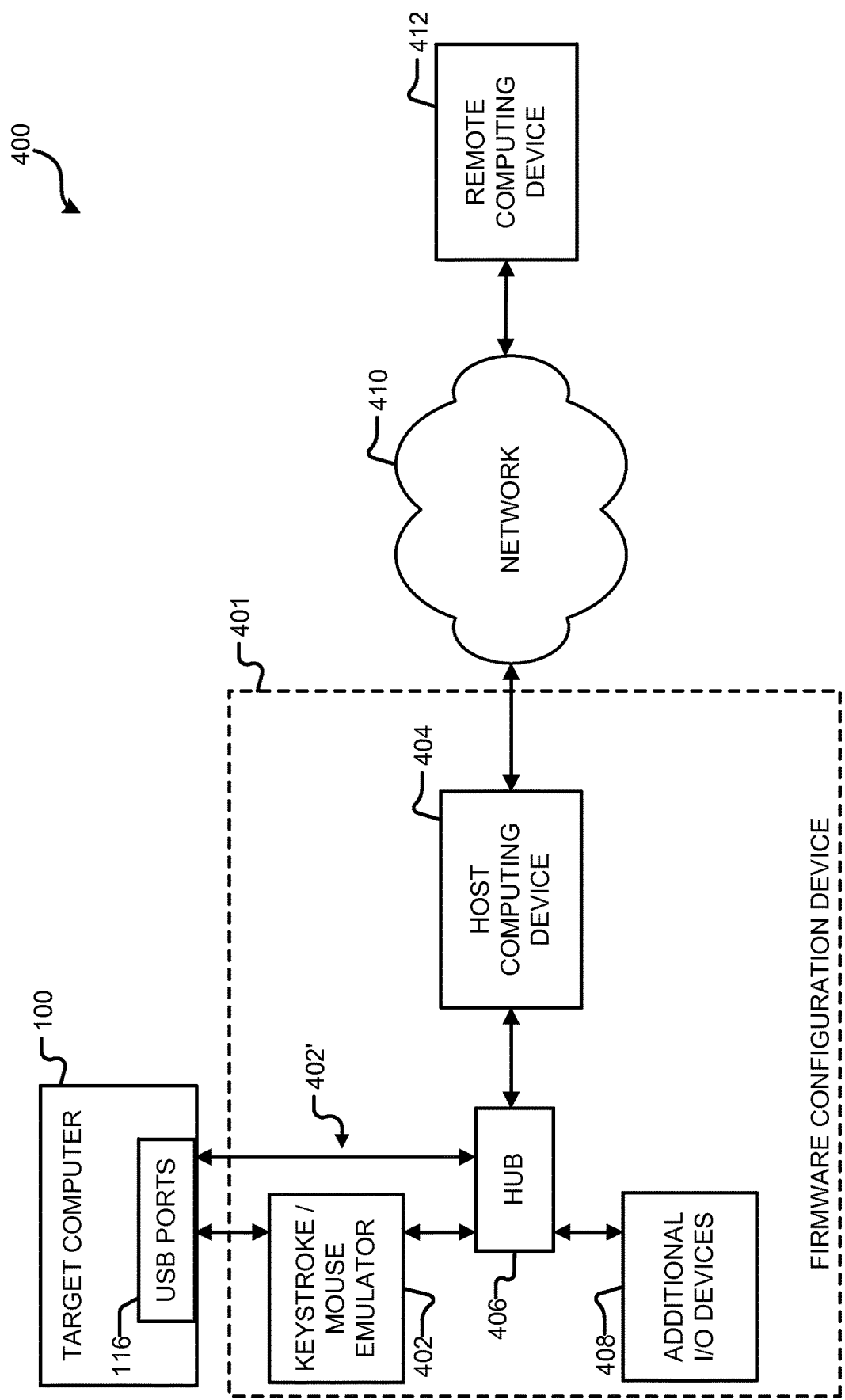
FIG. 4 is a system diagram showing aspects of one mechanism disclosed herein for firmware configuration through emulated commands.

Referring now to FIG. 4, a system diagram showing a system 400 that embodies the concepts and technologies disclosed herein will be described. The system 400 includes a target computer, such as the computing system 100, arranged in communication with a firmware configuration device 401. Generally, the firmware configuration device 401 may be a customizable implementation of hardware devices and program modules that are operative to transmit emulated keystroke and mouse movement data to the target computer 100.

Furthermore, the firmware configuration device 401 may be arranged to receive one or more command codes from the target computer 100, such as, for example, a series of at least three logical bits represented by the three typically available keyboard output status lights. These status lights generally include a CAPS LOCK status light bit, a NUM LOCK status light bit, and a SCROLL LOCK status light bit. Through use of the USB ports 116, the target computer 100 may implement a logical one or zero for each of the individual status light bits to create a three-bit command code. Accordingly, for a typical keyboard interface, there may be up to eight separate and distinct command codes that may be created, including a null command of three logical zeros. Such command codes can include, for example, a NULL, START, END, ACK ERROR, ACK SUCCESS, and other commands. The particular binary value that represents each command may be varied across any implementation. Other possible command codes are described herein in detail with reference to FIGS. 5-8.

As further illustrated in FIG. 4, the USB ports 116 may be in operative communication with a keystroke/mouse emulator 402 of the firmware configuration device 401. The keystroke/mouse emulator 402 may be a hardware device configured to transmit keystroke and mouse movement data to the USB ports 116. The keystroke/mouse emulator 402 may also be configured to receive the three-bit command codes transmitted from the target computer 100. The USB ports 116 and the keystroke/mouse emulator 402 may be in operative communication with a hub device 406, such as a USB hub. The hub device 406 may further be in communication with a host computing device 404 and additional I/O devices 408. Accordingly, the host computing device 404 may be in serial communication with the keystroke/mouse emulator 402, the additional I/O devices 408, and the target computer 100 via the hub device 406.

The host computing device 404 may be a hardware device, such as a portable computing device, including, but not limited to, a tablet computing device, a smartphone, a laptop computing device, and/or any suitable computing device. According to at least one implementation, the host computing device 404 is a smartphone having one or more communication interfaces for communicating with a remote computing device 412 over a network 410. According to other implementations, the host computing device 404 is a customized arrangement of computing components arranged similar to a smartphone. For example, the arrangement of computing components that comprise host computing device 404 can include a display device, a processor or processors, one or more wireless communication interfaces, a near-field communication ("NFC") interface, a BLUETOOTH communication interface, a microphone, a speaker, an accelerometer, a global positioning system ("GPS") interface, a gyroscope, a camera, and/or any other more or fewer suitable components and arrangements of components.

The network 410 can include any suitable network, including a 3G or 4G cellular data network, another form of wireless data network, a local area network, and/or a wide area network, and others. The remote computing device 412 can include any suitable computing device, including the forms described above with reference to host computing device 404 and the target computing device 100.

As described above, the firmware configuration device 401 is configured to communicate with the target computer 100 using emulated keystroke and mouse movement data. According to one implementation, the emulated data is created as serial data at the host computing device 404 and transferred to the keystroke/mouse emulator 402 for emulation at the USB ports 116. According to other implementations, the host computing device 404 can emulate the keystroke and mouse data and apply the same emulated data directly to the USB ports 116 with a direct USB interface connection 402'.

Additionally, although illustrated as separate devices, the firmware configuration device 401 and target computer 100 may be arranged as a single interfaced device in some implementations. According to other implementations, the firmware configuration device 401 is arranged as a USB "dongle" device for relatively easy connection to any number of target computers. The operation of both the firmware configuration device 401 and the target computer 100, and specifically communication between the firmware configuration device 401 and the target computer 100, are described in detail below.

Figure 5:
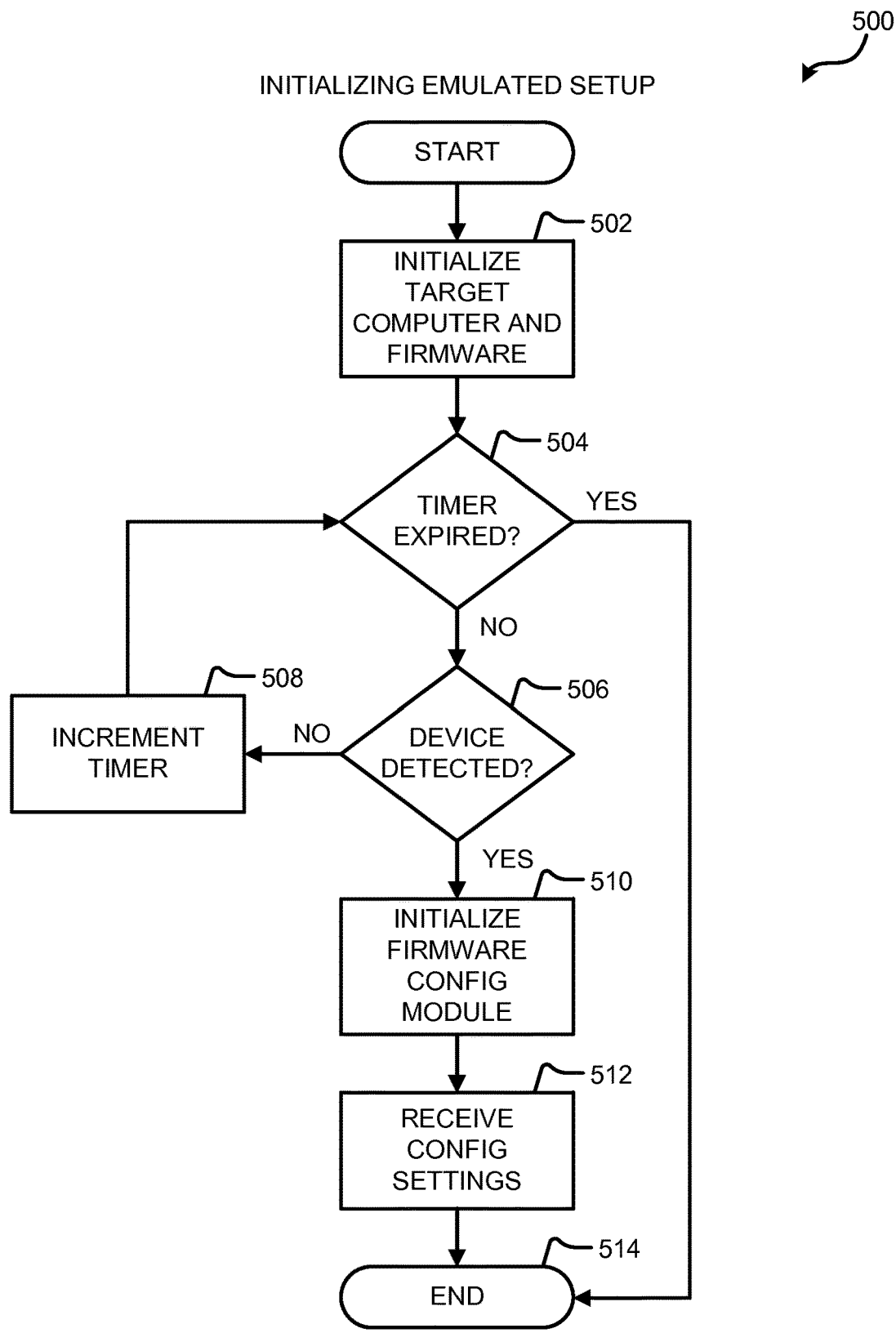
FIG. 5 is a flow diagram showing a routine for initiating an emulated setup mode for firmware configuration according to technologies presented herein.

Referring now to FIG. 5, a flow diagram showing a routine 500 for initiating an emulated setup mode for firmware configuration according to embodiments presented herein will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 502 where the target computer 100 and associated firmware 137 are initialized. Upon initialization, the target computer 100 determines if an emulated setup timer has expired at operation 504. The emulated setup timer may be arranged as a clock-dependent timer or a counter, or as any suitable threshold condition-based conditional logic.

If the timer has expired, the routine 500 ceases at block 514 and the target computer 100 continues initialization in a conventional manner. If the timer has not expired, the target computer 100 determines if a firmware configuration device 401 has been interfaced with the USB ports 116 and/or is detectable, at operation 506.

If there is no firmware configuration device 401 detected at operation 506, the timer may be incremented at block 508, and the routine 500 may iterate through blocks 504, 506 and 508 until the timer expires. Alternatively, if the firmware configuration device 401 is detected, the target computer 100 may initialize the firmware configuration module 150 at operation 510.

The firmware configuration module 150 may allow the receipt of initial configuration settings, such as, for example, date/time information, global positioning system ("GPS") coordinates, and other configuration settings from the firmware configuration device 401 through receipt of emulated keystroke and mouse movement data, at operation 512. Upon receipt and implementation of the initial configuration settings, and other settings and information as described herein, the routine 500 may cease at operation 514 and the target computer may continue operation normally using any new settings received from the firmware configuration device 401.

The other settings and information that are received can include firmware files, program code, firmware values, and any other suitable information. The other settings and information may be received by the target computer 100 over USB ports 116 as emulated keystroke and mouse data. The transmission and receipt of the other settings and information is described more fully below with reference to FIGS. 6-8.

Figure 6:
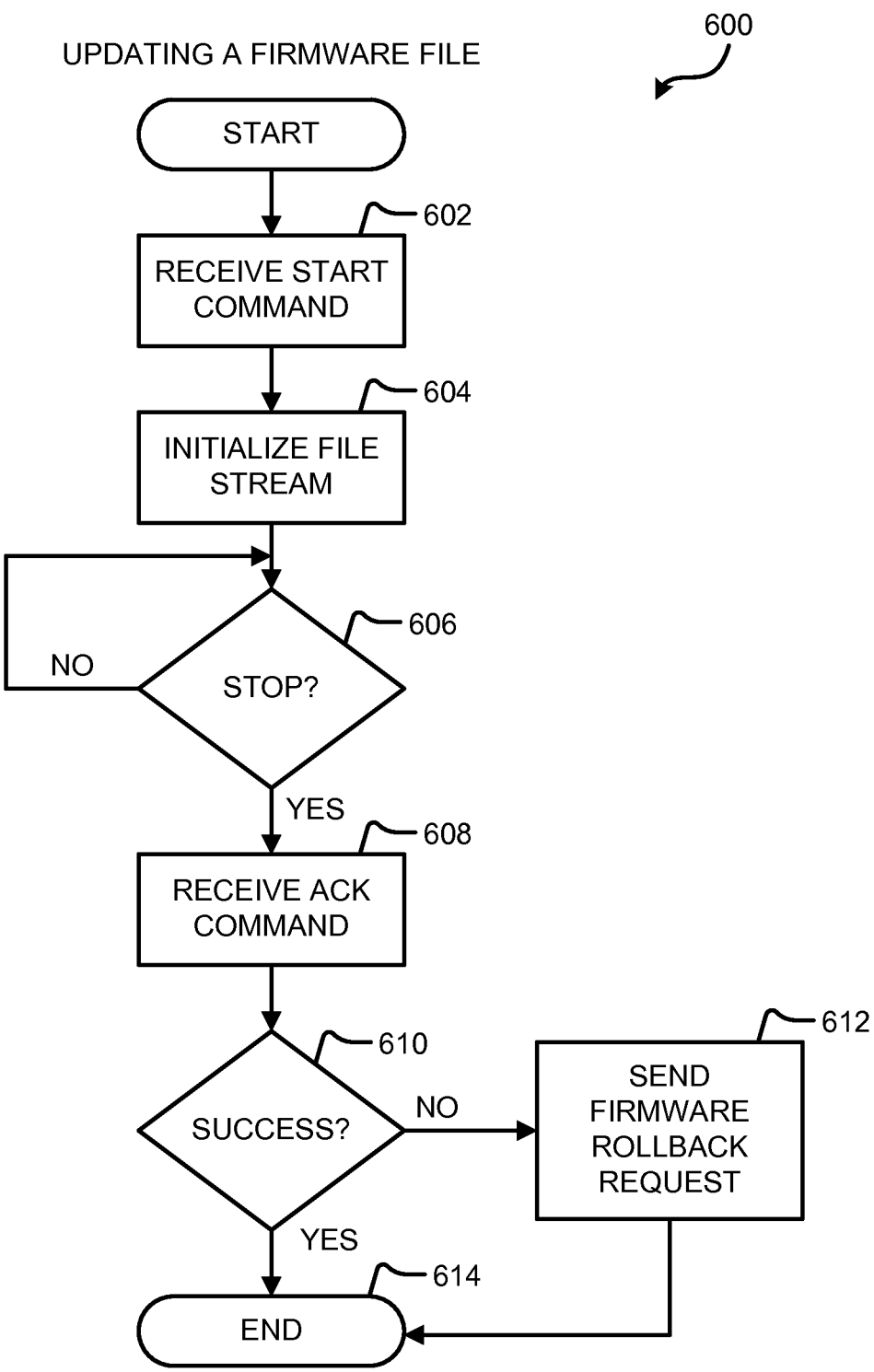
FIG. 6 is a flow diagram showing a routine for applying a firmware update using emulated commands according to technologies presented herein.

FIG. 6 is a flow diagram showing a routine 600 for applying a firmware update using emulated commands according to technologies presented herein. The routine 600 begins at operation 602, where the firmware configuration device 401 receives a START command code from the target computer 100. The START command code may be any suitable arrangement of keyboard status light bits as described above. The START command code may indicate readiness of the target computer 100 to receive a file, including a new firmware file or an updated firmware file.

Responsive to being prompted with the START command, the firmware configuration device 401 initializes a file stream at operation 604. The file stream may be any suitable stream of bits represented as keystroke and/or mouse movement data. For example, alternating keystroke values may be used to represent logical binary values to implement a stream of a file. As another example, a series of particular mouse movement gestures can represent the stream of data. For example, alternating upward and downward movements, circular movements, and other such emulated mouse movement data can present a stream of data. Furthermore, longitudinal and/or cyclical redundancy checks may be used to verify transmission of data. Other file streams, including more complex or simplified streams, may also be suitable.

During transmission, the firmware configuration device 401 may determine if the file stream should cease at block 606, for example, due to complete transmission or receipt of a request to stop from the target computer 100. Upon ceasing the file stream, an ACK command may be received at operation 608. The ACK command may include an acknowledgement of successful transmission, an ERROR command, a REPEAT command, or any other suitable acknowledgement. Depending upon the particular ACK command received, the firmware configuration device 401 may determine success at operation 610 and the routine 600 may cease at operation 614. Alternatively, if the received ACK command indicates an error, the firmware configuration device 401 may send a firmware file rollback request to the target computer 100, at operation 612, to ensure the unsuccessfully transmitted file is not used.

Figure 7:
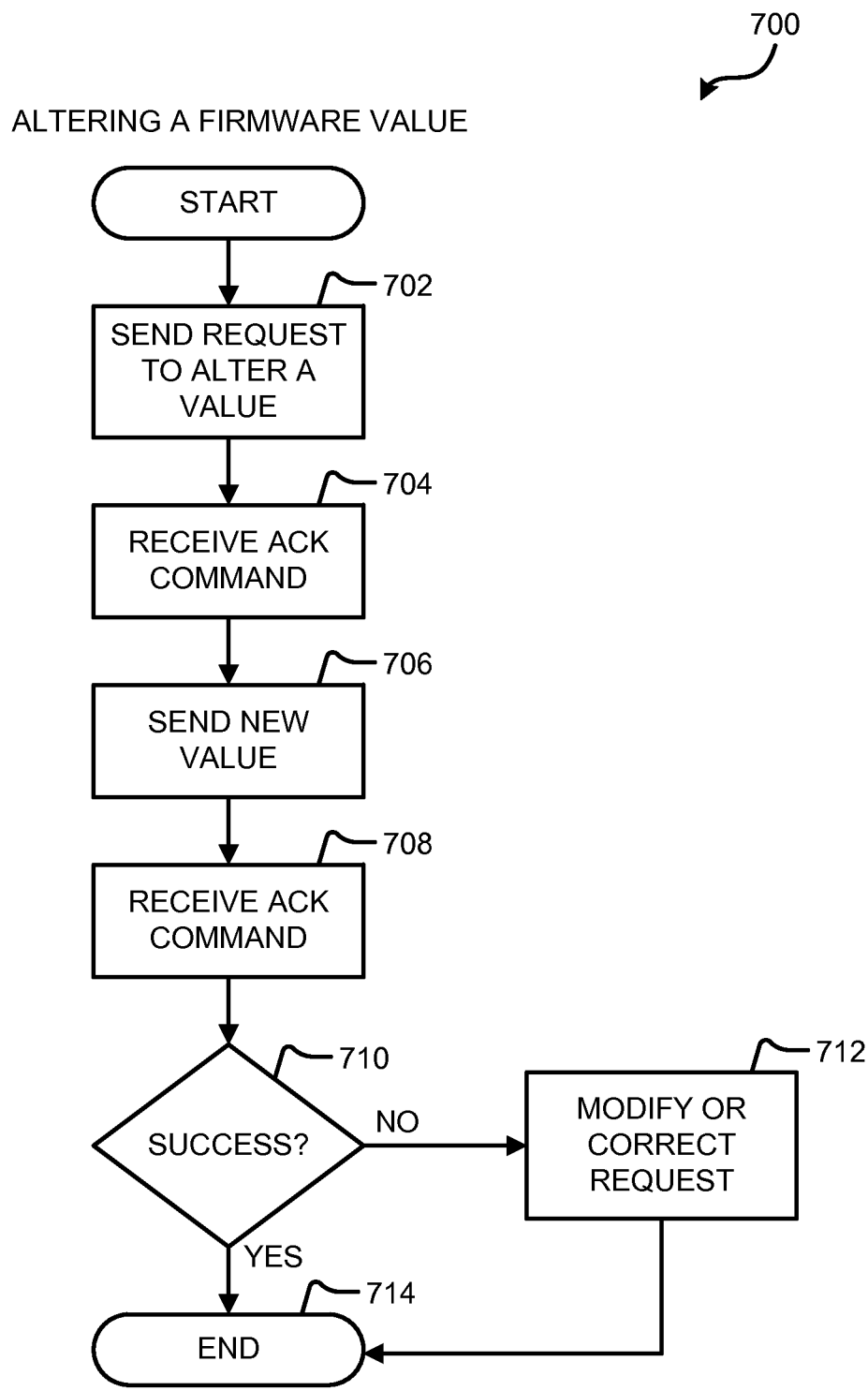
FIG. 7 is a flow diagram showing a routine for altering a firmware value according to technologies presented herein.

FIG. 7 is a flow diagram showing a routine 700 for altering a firmware value according to technologies presented herein. Conventional firmware systems, including BIOS systems, generally include a plurality of basic values that can be manipulated or altered according to a desired configuration of a target computer. For example, the availability of a particular interface, expansion device, disk I/O, and other components may be governed by these values. The firmware configuration device 401 may request changes to these and other values using routine 700.

The firmware configuration device 401 may send a request to alter a firmware variable at operation 702. The request may include a series of emulated keystroke and/or mouse movement data that indicates both a variable to be changed and any other suitable information. Responsive thereto, the target computer 100 may transmit an ACK command at operation 704 indicating acknowledgement of the request. Upon receiving the ACK command, the firmware configuration device 401 may send a new value for the firmware variable at operation 706 and a new ACK command may be received at operation 708. Alternatively, the request transmitted at operation 702 may include both the identification of the variable and the new value.

Upon processing the received ACK commands, the firmware configuration device 401 may determine if the request to alter the firmware variable was successful at operation 710. If the request was successful, the routine 700 may cease at operation 714. Alternatively, if the request was not successful, the firmware configuration device 401 may modify or correct the request and reattempt the routine 700, at operation 712.

Figure 8:
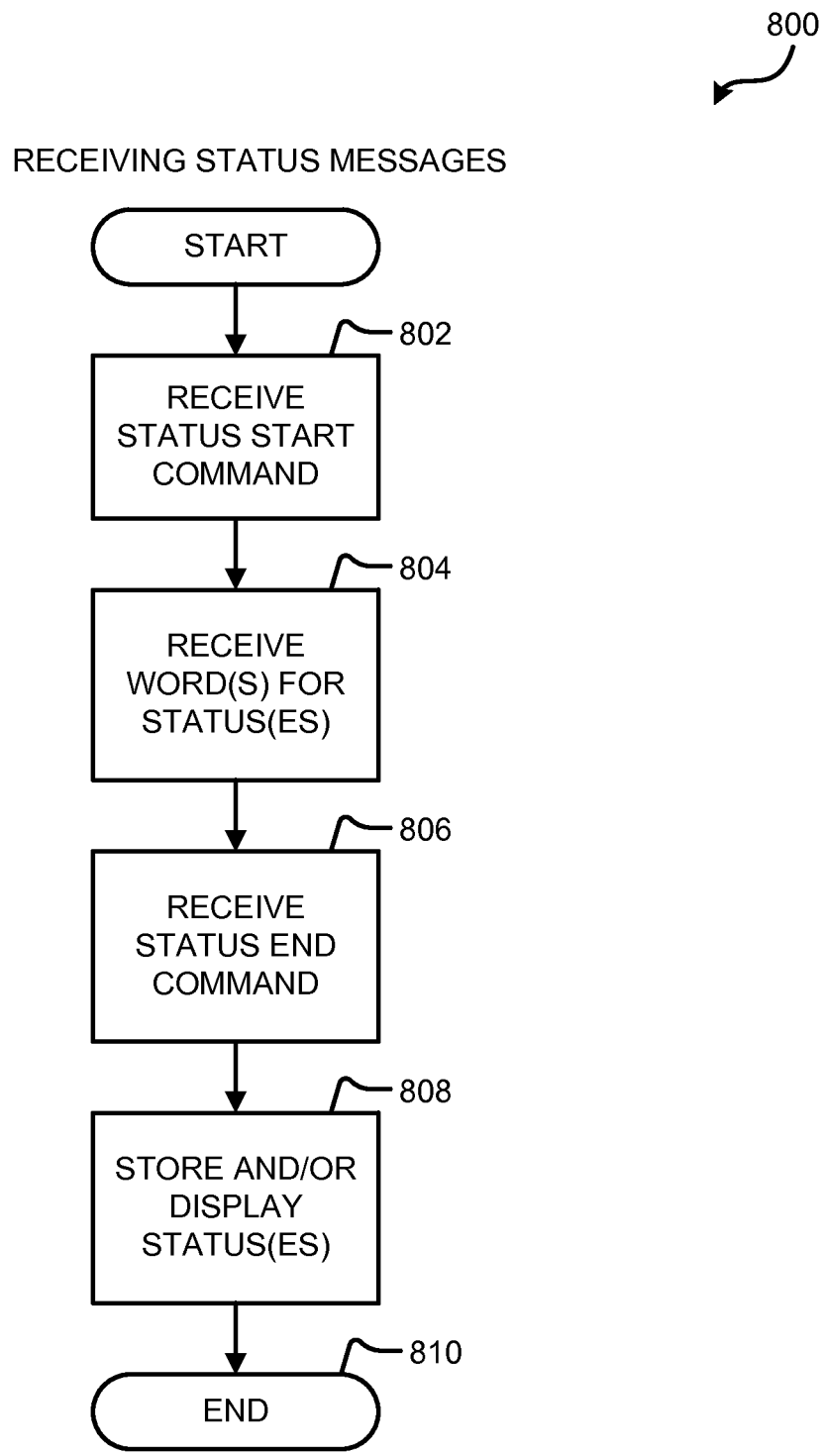
FIG. 8 is a flow diagram showing a routine for receiving status messages from a target computer according to technologies presented herein.

FIG. 8 is a flow diagram showing a routine 800 for receiving status messages from a target computer according to technologies presented herein. As described above, the target computer 100 may transmit a series of three-bit combinations of keyboard status light data as NULL, START, END, ACK ERROR, ACK SUCCESS, and other suitable commands. However, as three bits are available, allowing for a total of eight different commands, one or more commands may be reserved for more complex status information to be transmitted from the target computer 100 to the firmware configuration device 401. Such complex status information may be arranged in any suitable manner, including as one or more words or values for particular hardware and software components of the target computer. These can include values for temperature, I/O status, cooling system status, and other such information. The reserved commands may allow for simple binary streams to be cast by alternating between the two reserved commands.

As a non-limiting example, a TR UP and a TR DN command may be reserved for transmission. The TR UP and TR DN commands may then be fluctuated to represent upward and downward elements of a simplified binary stream for receipt by the firmware configuration device 401. Other reserved commands may be implemented, depending upon any desired implementation.

As shown in FIG. 8, the routine 800 for receiving the status information includes the firmware configuration device receiving a START command at operation 802. The START command may be a "start status transmission" command represented by a different three-bit combination as compared to the "start file transmission" command described with reference to FIG. 5. Upon receipt of the command, the firmware configuration device 401 may receive the binary stream described above, at operation 804. The binary stream may include any number of words, values, and other data for status or statuses of components of the target computer 100. Upon completion of the binary stream, the target computer 100 may implement an END command that is received by the firmware configuration device 401, at operation 806. Thereafter, the firmware configuration device 401 may store and/or display the received status information at operation 808, and the routine 800 may cease at operation 810.

It should be appreciated that, according to implementations, the mechanisms disclosed herein may allow firmware configuration through emulated commands. The emulated commands may be arranged as emulated keystroke and mouse movement data. The emulated data may be used to transmit information to a target computer and to receive information from the target computer.

Based on the foregoing, it should be appreciated that technologies for firmware configuration through emulated commands have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for configuring a firmware, the method comprising:
   initializing a target computer and a firmware of the target computer, the target computer having at least one universal serial bus ("USB") port;
   determining if a firmware configuration device is detected at the target computer, the firmware configuration device interfaced with the at least one USB port and being detectable as an emulated keyboard at the at least one USB port;
   responsive to detecting the firmware configuration device, initializing a firmware configuration module to communicate with the firmware configuration device;
   sending, by means of the at least one USB port, a first command code to the firmware configuration device, wherein the first command code comprises a first combination of binary values for keyboard status lights, the first command code indicating that the target computer is ready to receive firmware configuration data to change a configuration of the firmware;
   receiving emulated keystroke data from the firmware configuration device in response to the first command code, the emulated keystroke data defining firmware configuration data for configuring the firmware; and
   sending, by means of the at least one USB port, a second command code to the firmware configuration device in response to the firmware configuration data, wherein the second command code comprises a second combination of binary values for the keyboard status lights, the second command code indicating a state of receipt of the firmware configuration data to change the configuration of the firmware.

2. The computer-implemented method of claim 1, further comprising waiting for the expiration of a timer, and upon expiration, finalizing initialization of the target computer without receiving the firmware configuration data from the firmware configuration device.

3. The computer-implemented method of claim 1, wherein the firmware configuration device is further detectable as an emulated mouse at the at least one USB port.

4. The computer-implemented method of claim 3, further comprising receiving emulated mouse movement data from the firmware configuration device, the emulated mouse movement data further defining the firmware configuration data.

5. The computer-implemented method of claim 4, wherein the emulated mouse movement data defines the firmware configuration data as a series of mouse gestures.

6. The computer-implemented method of claim 1, wherein the emulated keystroke data defines the firmware configuration data as a series of keystrokes.

7. The computer-implemented method of claim 1, wherein the firmware configuration data comprises a new firmware file.

8. The computer-implemented method of claim 1, wherein the firmware configuration data comprises global positioning system ("GPS") coordinates of the firmware configuration device or time zone information of the firmware configuration device.

9. The computer-implemented method of claim 1, wherein the firmware configuration data comprises one or more new values for variables used by the associated firmware.

10. A computer-readable storage medium having computer-executable instructions stored thereupon which, when executed by a computer, cause the computer to:
    initialize a firmware and at least one universal serial bus ("USB") port of the computer;
    determine if a firmware configuration device is detected at the computer, the firmware configuration device interfaced with the at least one USB and being detectable as an emulated keyboard connected to the at least one USB port;

responsive to detection of the firmware configuration device, initialize a firmware configuration module to communicate with the firmware configuration device;

send, by means of the at least one USB port, a first command code to the firmware configuration device, wherein the first command code comprises a first combination of binary values corresponding to a first keyboard status light signal, the first command code indicating that the computer is ready to receive firmware configuration data to change a configuration of the firmware;

receive emulated keystroke data from the firmware configuration device, the emulated keystroke data defining the firmware configuration data; and send, by means of the at least one USB port, a second command code to the firmware configuration device in response to the firmware configuration data, wherein the second command code comprises a second combination of binary values corresponding to a second keyboard status light signal, the second command code indicating a state of receipt of the firmware configuration data to change the configuration of the firmware.

11. The computer-readable storage medium of claim 10, wherein the firmware configuration device is further detectable as an emulated mouse connected to the at least one USB port.

12. The computer-readable storage medium of claim 11, having further computer-executable instructions stored thereupon to receive emulated mouse movement data from the firmware configuration device, the emulated mouse movement data further defining the firmware configuration data.

13. The computer-readable storage medium of claim 12, wherein the emulated mouse movement data defines the firmware configuration data as a series of mouse gestures.

14. The computer-readable storage medium of claim 10, wherein the emulated keystroke data defines the firmware configuration data as a series of keystrokes.

15. The computer-readable storage medium of claim 10, wherein the firmware configuration data comprises a new firmware file.

16. An apparatus, comprising:

a processor;

a universal serial bus ("USB") interface in communication with the processor; and a computer-readable storage medium in communication with the processor, the computer-readable storage medium having computer-executable instructions stored thereupon which, when executed by the processor, cause the apparatus to receive a sequence of command codes at the USB interface responsive to respective sets of first firmware configuration data to change a configuration of a firmware of a target computer, wherein the sequence of command codes is received as respective combinations of binary values corresponding to respective keyboard status light signals, a first command code in the sequence of command codes indicating that the target computer is ready to receive at least one of the respective sets of firmware configuration data, and responsive to the sequence of command codes, transmit second sets of emulated keystroke data or emulated mouse movement data over the USB interface, the emulated keystroke data or emulated mouse movement data defining second firmware configuration data.

17. The apparatus of claim 16, wherein the emulated mouse movement data defines the second firmware configuration data as a series of mouse gestures.

18. The apparatus of claim 16, wherein the emulated keystroke data defines the second firmware configuration data as a series of keystrokes.

* * * * *